(12) United States Patent
Imber

(10) Patent No.: US 12,020,145 B2
(45) Date of Patent: Jun. 25, 2024

(54) END-TO-END DATA FORMAT SELECTION FOR HARDWARE IMPLEMENTATION OF DEEP NEURAL NETWORKS

(71) Applicant: Imagination Technologies Limited, Kings Langley (GB)

(72) Inventor: James Imber, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 1131 days.

(21) Appl. No.: 16/181,147

(22) Filed: Nov. 5, 2018

(65) Prior Publication Data

US 2019/0236449 A1  Aug. 1, 2019

(30) Foreign Application Priority Data

Nov. 3, 2017 (GB) ..................... 1718289

(51) Int. Cl.
*G06N 3/063* (2023.01)
*G06F 7/483* (2006.01)
(Continued)

(52) U.S. Cl.
CPC .............. *G06N 3/08* (2013.01); *G06F 7/483* (2013.01); *G06N 3/04* (2013.01); *G06N 3/063* (2013.01); *G06N 3/082* (2013.01); *G06N 3/045* (2023.01)

(58) Field of Classification Search
CPC ........ G06N 3/04; G06N 3/0454; G06N 3/063; G06N 3/08; G06N 3/082; G06F 7/483
See application file for complete search history.

(56) References Cited

U.S. PATENT DOCUMENTS 10,621,486 B2 *  4/2020  Yao ...................... G06N 3/0454
10,802,992 B2 * 10/2020  Yu ......................... G06N 3/082
(Continued)

FOREIGN PATENT DOCUMENTS

EP      3671570 A1    6/2020
GB     201715215     11/2017
(Continued)

OTHER PUBLICATIONS

Gupta, S. et al., "Deep Learning with Limited Numerical Precision" (Year: 2015).*
(Continued)

*Primary Examiner* — Alexey Shmatov
*Assistant Examiner* — Devika S Maharaj
(74) *Attorney, Agent, or Firm* — Potomac Law Group, PLLC; Vincent M DeLuca

(57) ABSTRACT

Methods for selecting fixed point number formats for representing values input to and/or output from layers of a DNN which take into account the impact of the fixed point number formats for a particular layer in the context of the DNN. The methods comprise selecting the fixed point number format(s) used to represent sets of values input to and/or output from a layer one layer at a time in a predetermined sequence wherein any layer is preceded in the sequence by the layer(s) from which it depends. The fixed point number format(s) for each layer is/are selected based on the error in the output of the DNN associated with the fixed point number formats. Once the fixed point number format(s) for a layer has/have been selected any calculation of the error in the output of the DNN for a subsequent layer in the sequence is based on that layer being configured to use the selected fixed point number formats.

20 Claims, 13 Drawing Sheets

(51) Int. Cl.
G06N 3/04 (2023.01)
G06N 3/045 (2023.01)
G06N 3/08 (2023.01)
G06N 3/082 (2023.01)

(56) References Cited

U.S. PATENT DOCUMENTS

| | | | |
|---|---|---|---|
| 2016/0328646 A1 | 11/2016 | Lin et al. | |
| 2016/0328647 A1 | 11/2016 | Lin et al. | |
| 2017/0024642 A1* | 1/2017 | Xiong | G06N 3/0454 |
| 2017/0061279 A1 | 3/2017 | Yang et al. | |
| 2017/0140259 A1* | 5/2017 | Bergstra | G06N 3/0445 |
| 2017/0220929 A1* | 8/2017 | Rozen | G06F 7/483 |
| 2017/0367685 A1* | 12/2017 | Zou | A61B 8/461 |
| 2018/0046896 A1* | 2/2018 | Yu | G06N 3/0454 |
| 2018/0107451 A1* | 4/2018 | Harrer | G06N 3/0454 |
| 2018/0181881 A1* | 6/2018 | Du | G06N 3/084 |
| 2018/0189642 A1* | 7/2018 | Boesch | G06F 30/327 |
| 2019/0034784 A1* | 1/2019 | Li | G06N 3/0454 |
| 2020/0210840 A1 | 7/2020 | Rouhani et al. | |

FOREIGN PATENT DOCUMENTS

| | | |
|---|---|---|
| KR | 101644039 B1 | 7/2016 |
| WO | 9838800 A1 | 9/1998 |
| WO | 2016/182671 A1 | 11/2016 |
| WO | 2020190526 A1 | 9/2020 |
| WO | 2021022903 A1 | 2/2021 |

OTHER PUBLICATIONS

Courbariaux, M. et al., "Training Deep Neural Networks with Low Precision Multiplications" (Year: 2015).*
Li, G. et al., "On comparing three artificial neural networks for wind speed forecasting" (Year: 2010).*
Lin, D. et al., "Fixed Point Quantization of Deep Convolutional Networks" (Year: 2016).*
Lin, D. et al., "Fixed Point Quantization of Deep Convolutional Networks", https://proceedings.mlr.press/v48/linb16.html (Year: 2016).*
Qiu et al; "Going Deeper with Embedded FPGA Platform for Convolutional Neural Network"; Proceedings of the 2016 ACM/SIGDA International Symposium on Field-Programmable Gate Arrays; Jan. 1, 2016; pp. 26-35.
Loroch et al; "TensorQuant—A Simulation Toolbox for Deep Neural Network Quantization"; Retrieved from the Internet: URL:https://arxiv.org/pdf/1710.05758.pdf[retrieved on Feb. 26, 2019] pp. 1-10.
Anwar et al; "Fixed Point Optimization of Deep Convolutional Neural Networks for Object Recognition"; 2015 IEEE International Conference on Acoustics, Speech and Signal Processing (ICASSP); Apr. 1, 2015; pp. 1131-1135.
Gysel et al., "Hardware-Oriented Approximation of Convolutional Neural Networks," Cornell University Library, ICLR Apr. 2016, pp. 1-8.
Lin et al., "Fixed Point Quantization of Deep Convolutional Networks," Proceeding ICML'16 Proceedings of the 33rd International Conference on International Conference on Machine Learning, vol. 48, pp. 2849-2858, New York, NY, USA—Jun. 19-24, 2016.
Moons et al., "Energy-Efficient ConvNets Through Approximate Computing," Cornell University Library, arXiv.org > cs > arXiv:1603.06777, Mar. 22, 2016.

* cited by examiner

END-TO-END DATA FORMAT SELECTION FOR HARDWARE IMPLEMENTATION OF DEEP NEURAL NETWORKS

BACKGROUND

A Deep Neural Network (DNN) is a type of artificial neural network that can be used for machine learning applications. In particular, a DNN can be used in signal processing applications, including image processing and computer vision applications.

DNNs have been implemented in applications where power resources are not a significant factor. Despite this, DNNs have application in a number of different technical fields in which the resources of the hardware used to implement the DNNs is such that power consumption, processing capabilities, or silicon area are limited.

There is therefore a need to implement hardware that is configured to implement a DNN in an efficient manner, i.e. in a manner that requires less silicon area or less processing power when operating. Moreover, DNNs can be configured in a number of different ways for a variety of different applications. There is therefore also a need for hardware for implementing a DNN to be flexible to be able to support a variety of DNN configurations.

The embodiments described below are provided by way of example only and are not limiting of implementations which solve any or all of the disadvantages of known hardware implementations of deep neural networks.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods for determining fixed point number formats for representing sets of values input to and/or output from layers of a DNN which take into account the impact of the fixed point number formats for a particular layer in the context of the DNN. The methods comprise selecting the fixed point number format(s) used to represent sets of values input to and/or output from a layer one layer at a time according to a predetermined sequence wherein any layer is preceded in the sequence by the layer(s) on which it depends. The fixed point number formats for each layer are selected based on the error in the output of the DNN associated with the fixed point number formats. Once the fixed point number format(s) for a layer has/have been selected any calculation of the error in the output of the DNN for a subsequent layer in the sequence is based on that layer being configured to use the selected fixed point number formats. In other words, the error in the output of the DNN is based on the DNN being configured to use the fixed point number formats already selected for the previous layers in the sequence. This allows fixed point number formats to be selected in a manner that accounts for the behaviour of the DNN as a whole.

A first aspect provides a computer-implemented method of identifying fixed point number formats for representing values input to, and/or output from, a plurality of layers of a Deep Neural Network "DNN" for use in configuring a hardware implementation of the DNN, the method comprising: determining a sequence of the plurality of layers in which each of the plurality of layers is preceded by any layer in the plurality of layers on which it depends; receiving an instantiation of the DNN configured to represent values input to, and/or, output from the plurality of layers of the DNN using a floating point number format; for each layer in the determined sequence: selecting a fixed point number format for representing each of one or more sets of values input to, or output from, the layer, wherein the fixed point number format for representing a set of values input to, or output from, a layer is selected so as to minimize an output error of the instantiation of the DNN; and reconfiguring the instantiation of the DNN to represent each of the one or more sets of values using the selected fixed point number format for that set of values.

A second aspect provides a computing-based device for identifying fixed point number formats for representing values input to, and/or output from, a plurality of layers of a Deep Neural Network "DNN" for use in configuring a hardware implementation of the DNN, the computing-based device comprising: at least one processor; and memory coupled to the at least one processor, the memory comprising: an instantiation of the DNN configured to represent values input to, and/or, output from each the plurality of layers of the DNN using a floating point number format; computer readable code that when executed by the at least one processor causes the at least one processor to: determine a sequence of the plurality of layers in which each of the plurality of layers is preceded by any layer in the plurality of layers on which it depends; for each layer in the determined sequence: select a fixed point number format for representing each of one or more sets of values input to, or output from, the layer, wherein the fixed point number format for representing a set of values input to, or output from, a layer is selected so as to minimize an output error of the instantiation of the DNN; and reconfigure the instantiation of the DNN to represent each of the one or more sets of values using the selected fixed point number format for that set of values.

A third aspect provides a hardware implementation of a Deep Neural Network "DNN" comprising: hardware logic configured to: receive input data values to a layer of the DNN; receive information indicating a fixed point number format for the input data values of the layer, the fixed point number format for the input data values of the layer having been selected in accordance with the method of the first aspect; interpret the input data values based on the fixed point number format for the input data values of the layer; and process the interpreted input data values in accordance with the layer to generate output data values for the layer.

The hardware implementation of the DNN may be embodied in hardware on an integrated circuit. There may be provided a method of manufacturing, at an integrated circuit manufacturing system, the hardware implementation. There may be provided an integrated circuit definition dataset that, when processed in an integrated circuit manufacturing system, configures the system to manufacture the hardware implementation of the DNN. There may be provided a non-transitory computer readable storage medium having stored thereon a computer readable description of a hardware implementation of a DNN that, when processed in an integrated circuit manufacturing system, causes the integrated circuit manufacturing system to manufacture an integrated circuit embodying a hardware implementation of a DNN.

There may be provided an integrated circuit manufacturing system comprising: a non-transitory computer readable storage medium having stored thereon a computer readable description of the hardware implementation of the DNN; a layout processing system configured to process the computer readable description so as to generate a circuit layout description of an integrated circuit embodying the hardware implementation of the DNN; and an integrated circuit generation system configured to manufacture the hardware implementation of the DNN according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
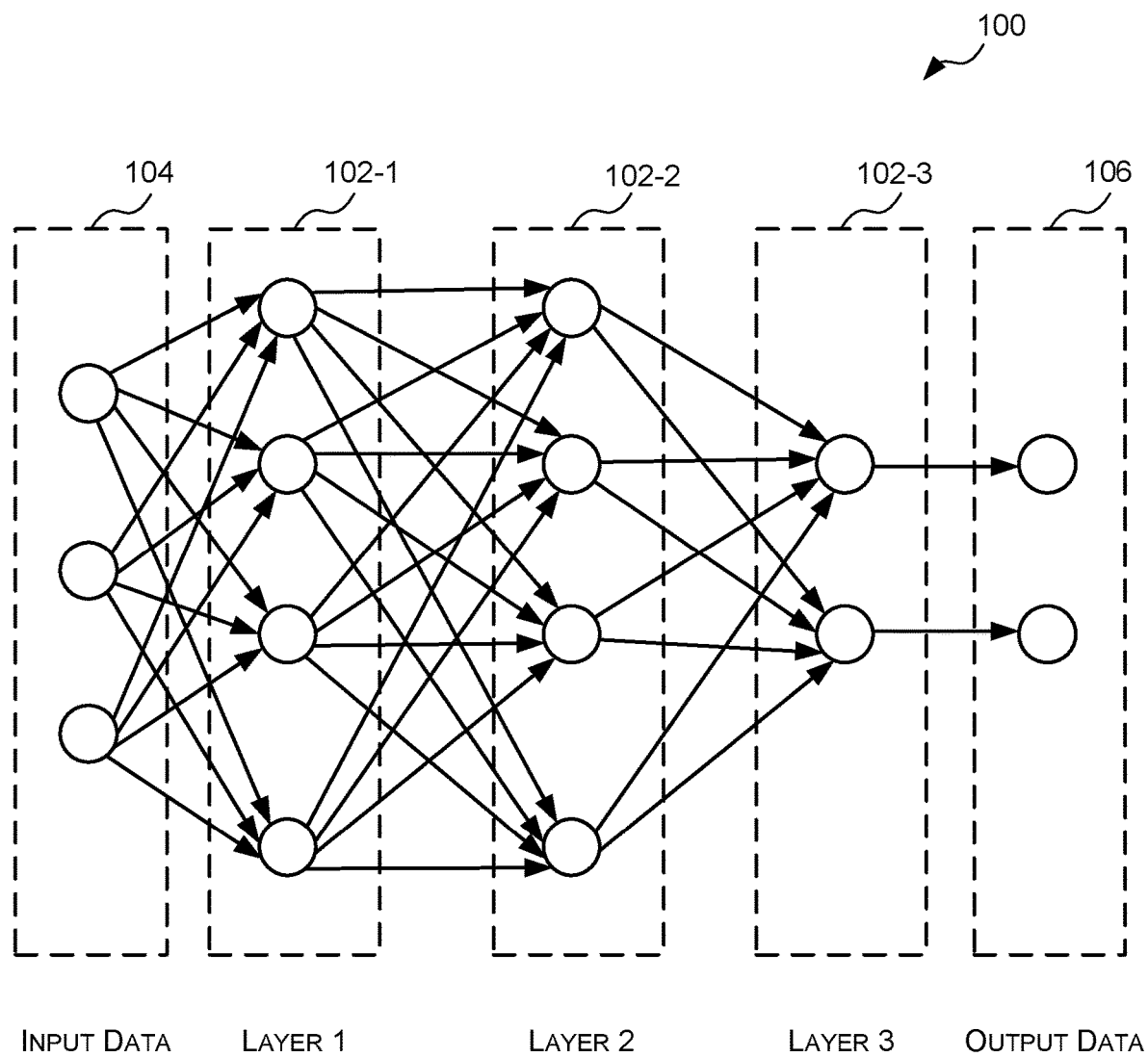
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A Deep Neural Network (DNN) is a form of artificial neural network comprising a plurality of interconnected layers that enable the DNN to perform signal processing tasks, including, but not limited to, computer vision tasks. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data, or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer and a fully connected layer. It will be evident to a person of skill in the art that these are example DNN layer types and that this is not an exhaustive list and there may be other DNN layer types.

For a convolution layer the input data is processed by convolving the input data using weights associated with that layer. Specifically, each convolution layer is associated with a plurality of weights $w_0 \ldots w_g$ which may also be referred to as filter weights or coefficients. The weights are grouped to form or define one or more filters, which may also be referred to as kernels, and each filter may be associated with an offset bias b.

Figure 2:
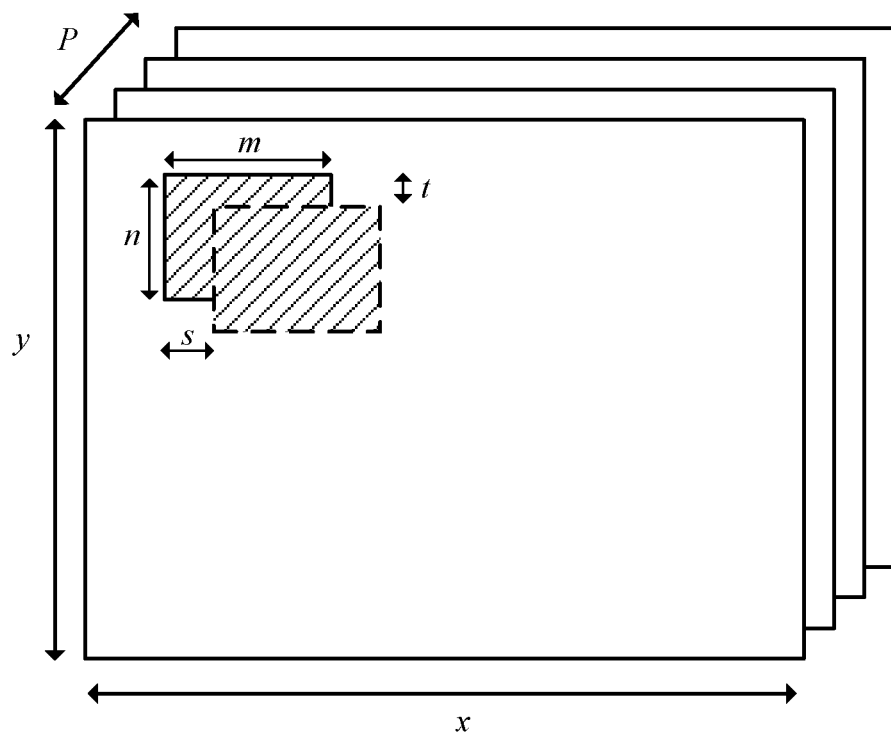
FIG. 2 is a schematic diagram of example data in a DNN.

Reference is made to FIG. 2 which illustrates an example overview of the format of data utilised in a DNN. As can be seen in FIG. 2, the data used in a DNN may be arranged as P planes of data, where each plane has a dimension x×y. A DNN may comprise one or more convolution layers each of which has associated therewith a plurality of filters formed by a plurality of weights. Each filter has a dimension m×n×P and is applied to the input data according to a convolution operation across several steps in direction s and t, as illustrated in FIG. 2. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a non-linear mathematical operation on it. In some examples, an activation layer may act as rectified linear unit (ReLU) by implementing an ReLU function (i.e. $f(x)=\max(0, x)$) or a Parametric Rectified Linear Unit (PReLU) by implementing a PReLU function.

A normalisation layer is configured to perform a normalising function, such as a Local Response Normalisation (LRN) Function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs an N dimensional vector. Where the DNN is used for classification N is the number of classes and each value in the vector represents the probability of a certain class. The N dimensional vector is generated through a matrix multiplication of a set of weights against the input data values, optionally followed by a bias offset. A fully connected layer thus receives a set of weights and a bias.

Accordingly each layer of a DNN receives input data values and generates output data values; and some layers also receive weights and/or biases.

A hardware implementation of a DNN comprises hardware logic configured to process input data to the DNN in accordance with the layers of the DNN. Specifically, a hardware implementation of a DNN comprises hardware logic configured to process the input data to each layer in accordance with that layer and generate output data for that layer which either becomes the input data to another layer or becomes the output of the DNN. For example, if a DNN comprises a convolution layer followed by an activation layer the hardware implementation for that DNN comprises hardware logic configured to perform a convolution on the input data to the DNN using the weights and biases associated with that convolution layer to produce output data for the convolution layer, and hardware logic configured to apply an activation function to the input data to the activation layer (i.e. the output data of the convolution layer) to generate output data for the DNN.

As is known to those of skill in the art, for hardware to process a set of values each value is represented in a number format. The two most suitable number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed anywhere within the representation. While representing values input to, and output from, the layers of a DNN in a floating point number format may allow more accurate or precise output data to be produced, processing numbers in a floating point number format in hardware is complex which tends to increase the silicon area and complexity of the hardware compared to hardware that processes values in fixed point number formats. Accordingly, hardware implementations may be configured to represent and process values input to, and/or output from, the layers of a DNN in a fixed point number format to reduce the area, power consumption and memory bandwidth of the hardware implementation.

A common fixed point number format is the Q format, which specifies a predetermined number of integer bits a and fractional bits b. Accordingly, a number can be represented as Qa. b which requires a total of a+b+1 bits (including the sign bit). Example Q formats are illustrated in Table 1 below.

TABLE 1

| Q Format | Description | Example |
| --- | --- | --- |
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value represented in Q format. For example, the first two bits of the representation do not contribute to the final number since they represent 0.5 and 0.25 respectively and therefore fall outside of the required range. However, they are used to indicate the value of the third bit position (i.e. 0.125 and beyond due to the relative bit positions). Accordingly, the Q format described above is an inefficient fixed point number format for use within a hardware implementation of a DNN since some bits may not convey useful information.

Therefore, in some cases, instead of using the Q format, some hardware implementations may be configured to use a fixed point number format for values input to, or output from, the layers of a DNN wherein each value x is represented by a fixed integer exponent e and an n-bit mantissa m format $x=2^e m$ which is defined by the exponent e and the number n of mantissa bits $\{e, n\}$. In some cases, the mantissa m may be represented in two's complement format, and in other cases other signed or unsigned integer formats may be used.

To reduce the size, and increase the efficiency, of a hardware implementation of a DNN the hardware implementation may be configured to represent and process values input to, and output from, layers of a DNN in fixed point number formats that use the smallest number of bits that is able to represent the expected or desired range for each set of values. Since the range for different sets of values (e.g. input data values, output data values, biases and weights), may vary within a layer and between layers, a hardware implementation may be able to process a DNN more efficiently when the fixed point number formats used to represent the input data values, output data values, weights, and/or biases can vary within a layer and between layers. For example, the hardware implementation may be able to implement the DNN more efficiently by using a fixed point number format comprising an exponent of 2 and a mantissa bit length of 6 to represent the input data values for a first layer, a fixed point number format comprising an exponent of 3 and a mantissa bit length of 12 to represent the weights of the first layer, and a fixed point number format comprising an exponent of 4 and a mantissa bit-length of 6 to represent the input data values for a second layer.

As a result, it is desirable to identify fixed point number formats (e.g. comprising an exponent and mantissa bit-length) for representing sets of values (e.g. input data values, output data values, weights or biases) that are input to, or output from, a layer of a DNN on a per layer basis. Some methods, such as that described in the Applicant's co-pending UK patent application filed the same day as the current application and entitled HISTOGRAM-BASED DATA FORMAT SELECTION FOR HARDWARE IMPLEMENTATION OF DEEP NEURAL NETWORK, which is herein incorporated by reference, involve selecting an appropriate fixed point number format (e.g. optimum exponent and mantissa bit length combination) for values input to, or output from, a layer on a per layer basis independent of the other layers. Such methods may be referred to herein as layer-independent methods. Layer-independent methods can be very efficient, in terms of processing time and processing power, at selecting an appropriate fixed point number format for sets of values input to, or output from, a layer (e.g. input data values, output data values, weights, or biases), however, in most cases the impact of using a particular fixed point number format for values of a layer on the DNN behaviour depends on the interaction with other layers of the DNN.

Accordingly, described herein are methods for selecting fixed point number formats for representing sets of values input to, and/or output from, layers of the DNN wherein the fixed point number formats for a particular layer are assessed in the context of the DNN. Specifically, in the described methods the fixed point number format(s) for representing sets of values input to, and/or output from, a layer of a DNN are selected one layer at a time in a predetermined sequence wherein any layer is preceded in the sequence by the layer(s) on which it depends. The fixed point number format(s) for each layer are selected from a plurality of potential fixed point number formats based on the output error of the DNN when each of the plurality of fixed point number formats are used to represent the values of the layer. Once the fixed point number format(s) for a layer has/have been selected the calculation of the output error of the DNN for a subsequent layer in the sequence is based on the DNN being configured to represent the values of that layer using the selected fixed point number formats. In other words, a determination of the output error of the DNN in assessing fixed point number formats for a layer is based on the DNN being configured to represent the values of the previous layers in the sequence using the previously selected fixed point number formats for those layers. This allows fixed point number formats to be selected in a manner that takes into account the behaviour of the DNN as a whole.

Furthermore, testing has shown that when a hardware implementation of a DNN is configured to implement fixed point number formats on a per-layer basis and the fixed point number formats are selected in accordance with the methods described herein the hardware implementation typically produces a more accurate output than when the fixed point number formats are selected in accordance with a layer-independent method (such as the histogram-based method described in the Applicant's co-pending application).

Figure 3:
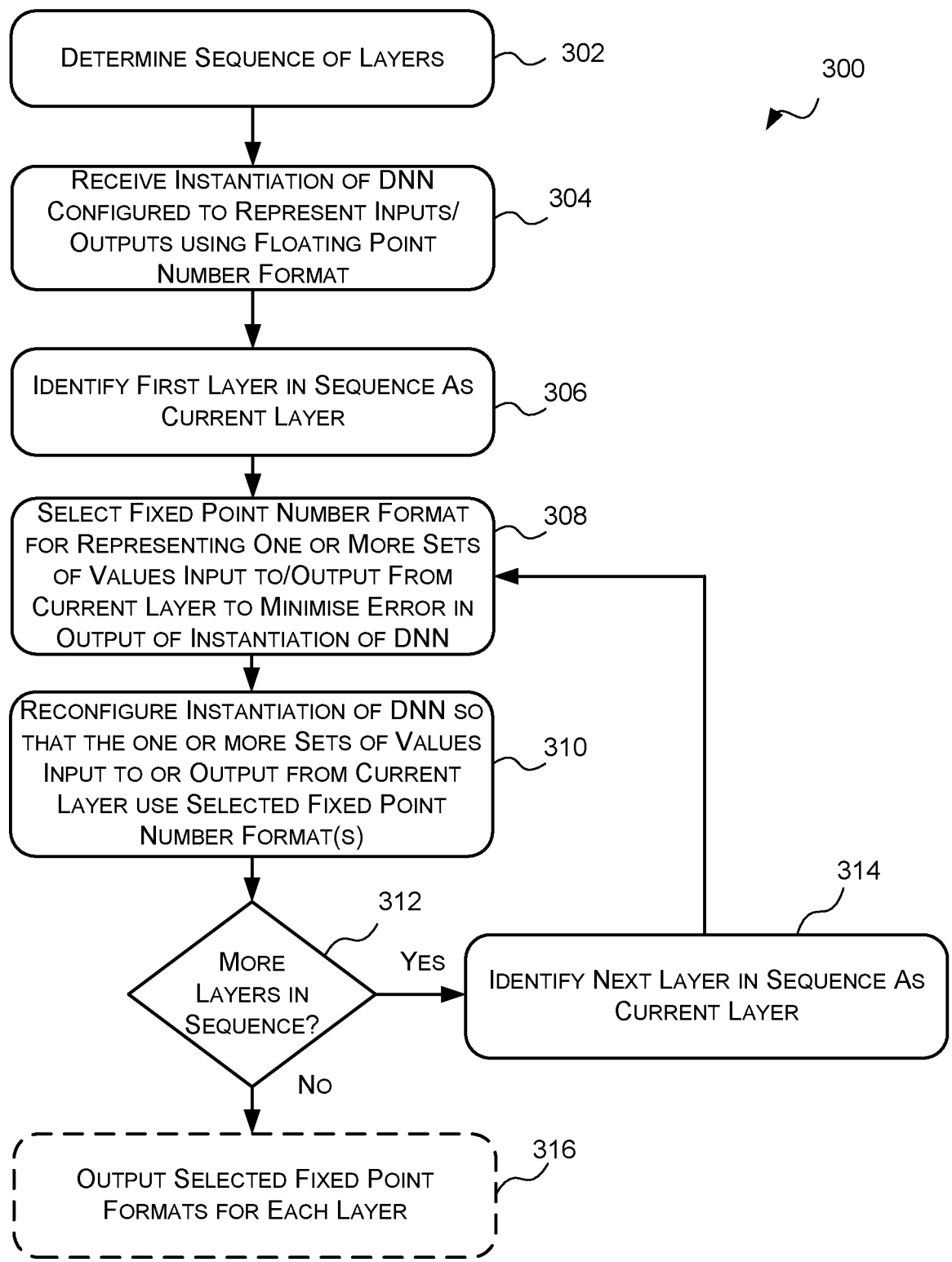
FIG. 3 is a flow diagram of an example method for determining fixed point number formats for representing sets of values input to, and output from, each layer of a DNN.

Reference is now made to FIG. 3 which illustrates an example method 300 for selecting fixed point number formats for representing sets of values input to, or output from, a plurality of layers of a DNN which can be used to configure a hardware implementation of the DNN. The plurality of layers may include all, or only a portion, of the layers of the DNN. The method 300 may be implemented by a computing-based device such as the computing-based device described below with respect to FIG. 11. For example, a computing-based device (e.g. computing-based device 1100) may include, or may have access to, computer readable medium (e.g. memory) that has computer readable instructions stored thereon, that when executed by a processor of the computing-based device causes the computing-based device to execute the method 300 of FIG. 3.

Figure 4:
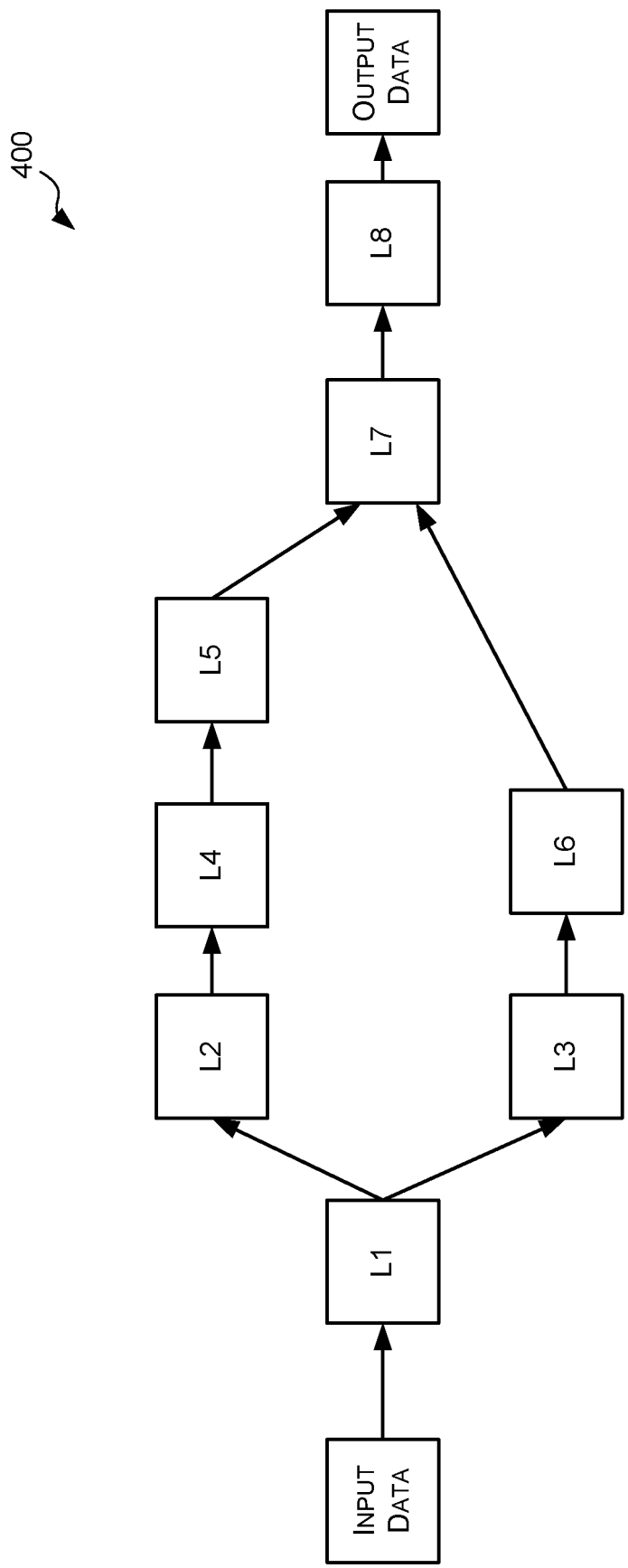
FIG. 4 is a schematic diagram of an example DNN and example sequences for the example DNN.

The method 300 begins at block 302, wherein a sequence of the plurality of layers is determined in which each of the plurality of layers is preceded in the sequence by the layer(s) of the plurality of layers on which it depends. As described above, a DNN comprises a plurality of interconnected layers wherein the output data of each layer (other than the last layer) becomes the input data to a subsequent layer. A layer which receives input data from an earlier layer is said to be dependent on that earlier layer. For example, FIG. 4 shows an example DNN 400 which comprises eight layers (L1, L2, L3, L4, L5, L6, L7 and L8). In this example, the output data of layer 1 (L1) is provided to layers 2 and 3 (L2, L3) as input data thus layers 2 and 3 are said to be dependent on layer 1; and the output data of layer 3 (L3) is provided to layer 6 (L6) as input data thus layer 6 (L6) is dependent on layer 3 (L3). Accordingly, any sequence of the layers in which L1 precedes L2 and L3; L2 precedes L4; L4 precedes L5; L3 precedes L6; L5 and L6 precede L7; and L7 precedes L8 would satisfy the condition of a sequence wherein each layer is preceded in the sequence by the layer(s) on which it depends. Examples of such sequences include the sequence L1, L2, L4, L5, L3, L6, L7 and L8, and the sequence L1, L3, L6, L2, L4, L5, L7 and L8.

Determining the fixed point number formats of the layers in the order set forth by the sequence ensures that subsequent layers take into account the fixed point number formats used in layers which affect the output data produced by that layer. Once a sequence of the layers of the DNN has been determined the method 300 proceeds to block 304.

At block 304, an instantiation of the DNN is received that is configured to use a floating point number format to represent values input to, and/or output from, the plurality of layers. An instantiation of a DNN embodies the DNN in a form which can be used to test the response of the DNN to input data. An instantiation of a DNN includes, but is not limited to, a software model of the DNN or a hardware implementation of the DNN. Values can typically be represented more accurately, or more precisely, in a floating point number format so a DNN that is configured to use floating point number formats to represent values input to and output from each layer represents a DNN that will produce the best or most accurate output. An instantiation of the DNN that is configured to use floating point number formats to represent values input to, and output from, each layer may be referred to herein as a floating point instantiation of the DNN, the baseline instantiation of the DNN, or the benchmark instantiation of the DNN. Once an instantiation of the DNN configured to use floating point number formats to represent the values input to, and output from, the plurality of layers has been received the method 300 proceeds to block 306.

At block 306, the first layer of the DNN in the sequence determined in block 302 is identified as the current layer. Once the first layer in the sequence has been identified as the current layer the method 300 proceeds to block 308.

At block 308, a fixed point number format is selected for each of one or more sets of values input to, or output from, the current layer that minimises the output error of the instantiation of the DNN. A set of values input to, or output from, a layer may be all or a portion of the input data values for a layer, all or a portion of the weights of a layer, all or a portion of the biases of a layer, or all or a portion of the output data values of a layer. Each layer may have one or more sets of values for which a fixed point number format is to be selected. For example, some layers may have a first set of values that represent the input data values to the layer which can be represented in a fixed point number format and a second set of values that represent the output data values of the layer which can be represented in a fixed point number format. In other examples, some layers (such as convolution layers and fully-connected layers) may have a third set of values that represent the weights of the layer which can be represented using a fixed point number format and a fourth set of values that represents the biases of the layer can be represented in a fixed point number format. Since different sets of values of a layer may have different ranges etc. different fixed point number formats may be selected for each set of values.

The fixed point number format for a set of values input to, or output from, a layer is selected to minimize the output error of the instantiation of the DNN. Specifically, as described above the most accurate output of the DNN is typically generated when the values input to, and output from, all layers of the DNN are represented using floating point number formats. As soon as one set of values input to, or output from, a layer are represented in a fixed point number format the output of the DNN becomes less accurate; and generally, the more sets of values that are represented in a fixed point number format, the more inaccurate the output of the DNN becomes. In the methods described herein, the fixed point number format that produces the smallest output error in the instantiation of the DNN when used to represent a set of values of a layer is selected as the fixed point number format for representing that set of values.

In some cases, the fixed point number format for representing a set of values input to, or output from, a layer may be selected through an iterative process wherein the instantiation of the DNN is temporarily modified so that the set of values of that layer are represented using one of a plurality of potential fixed point number formats; the output of the temporarily modified instantiation of the DNN in response to input test data is recorded; an error of the output (e.g. compared to a baseline output) is determined; the process is then repeated for each of the plurality of potential fixed point number formats; and the fixed point number format associated with the best output error is selected as the fixed point number format for representing the set of values input to, or output from, the layer. An example method for selecting a fixed point number format for representing a set of values input to, or output from, a layer of a DNN is described in detail below with reference to FIG. 5. Examples of how the output error may be calculated are also described below with respect to FIG. 5. Once a fixed point number format has been selected for representing each of the one or more sets of values input to, or output from, the layer the method 300 proceeds to block 310.

At block 310, the instantiation of the DNN is reconfigured to use the fixed point number format(s) selected in block 308 to represent the corresponding set of values for the current layer. For example, if during bock 308 a fixed point number format comprising an exponent of 2 and a mantissa bit length of 6 is selected to represent the input data values of layer 4 (L4) and a fixed point number format comprising an exponent of 3 and a mantissa bit length of 5 is selected to represent the output data values of layer 4 (L4), then the instantiation of the DNN is reconfigured to represent the input data values of layer 4 (L4) in a fixed point number format comprising an exponent of 2 and a mantissa bit length of 6, and to represent the output data values of layer 4 (L4) using a fixed point number format comprising an exponent of 3 and a mantissa bit length of 5.

Since the instantiation of the DNN is used to determine the output error associated with different fixed point number formats for subsequent layers, reconfiguring the instantiation of the DNN to represent the values of the current layer using the selected fixed point number format(s) ensures that the output error associated with different fixed point number formats for subsequent layers takes into account the fixed point number formats used in the layers on which it depends.

For example, in the example DNN 400 of FIG. 4 layer 2 (L2) is dependent on layer 1 (L1). If the instantiation of the DNN is configured to represent the values of layer 1 (L1) using the fixed point number formats selected for layer 1 (L1) prior to selecting the fixed point number format(s) for layer 2 (L2) the fixed point number formats used for layer 1 (L1) are taken into account in determining the effect of fixed point number formats used in layer 2 (L2) on the output error. Once the instantiation of the DNN is reconfigured to use the fixed point number formats selected in block 308 to represent the corresponding set(s) of values input to, or output from, the current layer the method 300 proceeds to block 312.

At block 312, a determination is made as to whether there are any more layers in the sequence. If there is at least one layer in the sequence following the current layer then the method 300 proceeds to block 314. If, however, there are no layers in the sequence following the current layer, indicating that fixed point number formats have been selected for the plurality of layers, then the method 300 may proceed to block 316 or the method 300 may end.

At block 314, the next layer in the sequence is identified as the current layer and the method 300 returns to block 308 where fixed point number format(s) for representing one or more sets of values input to, or output from, the current layer are selected.

At block 316, the fixed point number format(s) selected for the plurality of layers are output. In some cases, the fixed point number format(s) selected for the plurality of layers may be output to memory.

Once fixed point number formats for representing the sets of values input to, or output from, the plurality of layers have been determined in accordance with the method 300 of FIG. 3 one or more of the identified fixed point number formats may be used to configure a hardware implementation of a DNN. For example, one or more of the identified fixed point number formats may be used to configure the DNN to interpret the input data values, weights and/or biases as numbers in the identified format(s). This may allow the hardware implementation to more efficiently process the inputs to that layer. In another example, the identified fixed point number formats for a layer may be used to configure the DNN such that, when it does not receive the input data values, weights or biases for that layer in the identified fixed point number format(s), it converts the received input data values, weights and/or biases into the identified fixed point number format(s) to allow the hardware implementation to more efficiently process the inputs to that layer. In yet another example, the identified fixed point number formats may be used to configure the hardware implementation to convert the output data of another layer that feeds into a layer into the identified fixed point number format so that it will be provided to that layer in the identified fixed point number format. An example hardware implementation of a DNN and how the identified formats may be used to configure the hardware implementation are described below with reference to FIG. 10.

Figure 5:
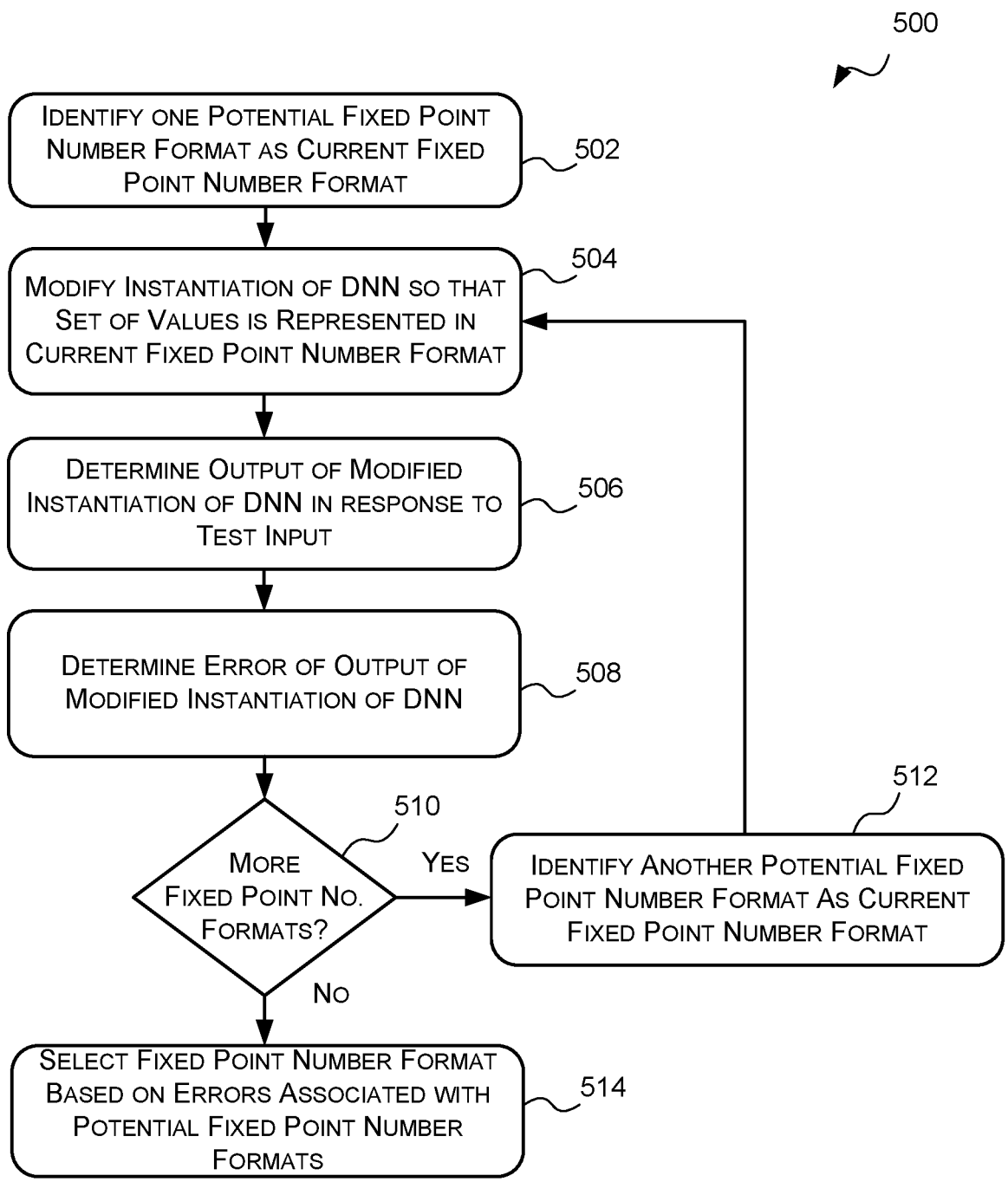
FIG. 5 is a flow diagram of an example method for selecting a fixed point number format for a set of values for a layer.

Reference is now made to FIG. 5 which illustrates an example method 500 for selecting a fixed point number format from a plurality of potential fixed point number formats for representing a set of values input to, or output from, a layer of a DNN that minimises the output error of the DNN. In this method 500 the fixed point number format for representing a set of values input to, or output from, a layer is selected through an iterative process in which an output error of the DNN (e.g. an error between the output of the DNN and a baseline output) is determined for each of the plurality of potential fixed point number formats; and, the fixed point number format with the best output error is selected as the format for representing the set of values. The method 500 of FIG. 5 may be implemented during block 308 of method 300 for each set of values input to, or output from, a layer that are to be represented in a fixed point number format.

The method 500 begins at block 502, where one fixed point number format of a plurality of potential fixed point number formats is selected as the current fixed point number format. The plurality of potential fixed point number formats comprises a plurality of different fixed point number formats which may be used to represent the set of values input to, or output from, the layer. As described above, a set of values input to, or output from, a layer may be all or portion of the input data values for a layer, all or a portion of the output data values for a layer, all or a portion of the weights for a layer, or all or a portion of the biases for a layer.

In some cases, each potential fixed point number format is defined by an exponent e and a mantissa bit length n. In some cases, the method 500 may be used to identify an optimal exponent e for a particular mantissa bit length n. In these cases, each of the plurality of potential floating point number formats may have the same mantissa bit length n, but different exponents e. In other cases, the method 500 may be used to identify an optimal mantissa bit length n for a particular exponent e. In these cases, each of the plurality of potential fixed point number formats may have the same exponent e, but different mantissa bit lengths n.

In some cases, the plurality of potential fixed point number formats may comprise all possible fixed point number formats. For example, where the exponent is fixed, the plurality of potential fixed point number formats may comprise a potential fixed point number format for each possible mantissa bit length n in combination with the fixed exponent e. In other cases, the plurality of potential fixed point number formats may comprise a subset of all possible fixed point number formats. The subset of fixed point number formats may include, for example, the possible fixed point number formats that are more likely to be the optimal fixed point number format based on one or more criteria. For example, where the mantissa bit length is fixed, the plurality of potential fixed point number formats may comprise potential fixed point number formats that comprise the particular mantissa bit length n in combination with only a subset of possible exponents e. Once a potential fixed point number format has been selected as the current fixed point number format the method 500 proceeds to block 504.

At block 504, the instantiation of the DNN is temporarily reconfigured to represent the relevant set of values for the layer according to the current fixed point number format. For example, where the current fixed point number format is defined by an exponent of 4 and a mantissa bit length of 12 and the set of values are the input data values for layer 2 (L2) then the instantiation of the DNN may be temporarily configured to represent the input data values to layer 2 (L2) using an exponent 4 and a mantissa bit length of 12. Once the instantiation of the DNN has been temporarily reconfigured to represent the relevant set of values for the layer according to the current fixed point number format the method 500 proceeds to block 506.

At block 506, test input data is provided to the temporarily reconfigured instantiation of the DNN and the output of the temporarily reconfigured DNN in response to the test input data is recorded. Where the DNN is a classification network the output of the DNN may be a set of logits. As is known to those of skill in the art, a classification network determines the probability that the input data falls into each of a plurality of classes. The network generally generates a data vector with one element corresponding to each class, and each of these elements is called a logit. For example, a classification network with 1000 classifications may output a vector of 1000 logits. In some cases, the output of the DNN may instead be the output of a SoftMax function applied to the logits. As is known to those of skill in the art, the SoftMax function is a transformation applied to the logits output by a DNN so that the values associated with each classification add up to 1. This allows the output of the SoftMax function to represent a probability distribution over the classes. The output of the SoftMax function may be referred to as the SoftMax normalised logits. The SoftMax function can be expressed as shown in equation (1) where $s_i$ is the softmax output for class i, $z_i$ is the logit for class i, and i and j are vector indices corresponding to the classes:

$$s_i(z) = \frac{e^{z_i}}{\Sigma_j e^{z_j}} \quad (1)$$

In some cases, multiple sets of test input data may be provided to the temporarily reconfigured instantiation of the DNN. For example, in some cases, where the input data to the DNN is expected to be an image, 10-50 test images may be provided to the temporarily reconfigured instantiation of the DNN. In these cases, the output data may comprise the output data (e.g. logits) generated in response to each test input (e.g. test image). Once the output data of the temporarily reconfigured instantiation of the DNN in response to the test input data has been recorded the method 500 proceeds to block 508.

At block 508, an error in the output of the temporarily reconfigured instantiation of the DNN is determined which may be referred to herein as the output error associated with the current fixed point number format. The error quantitively represents the quality of the output.

Figure 6:
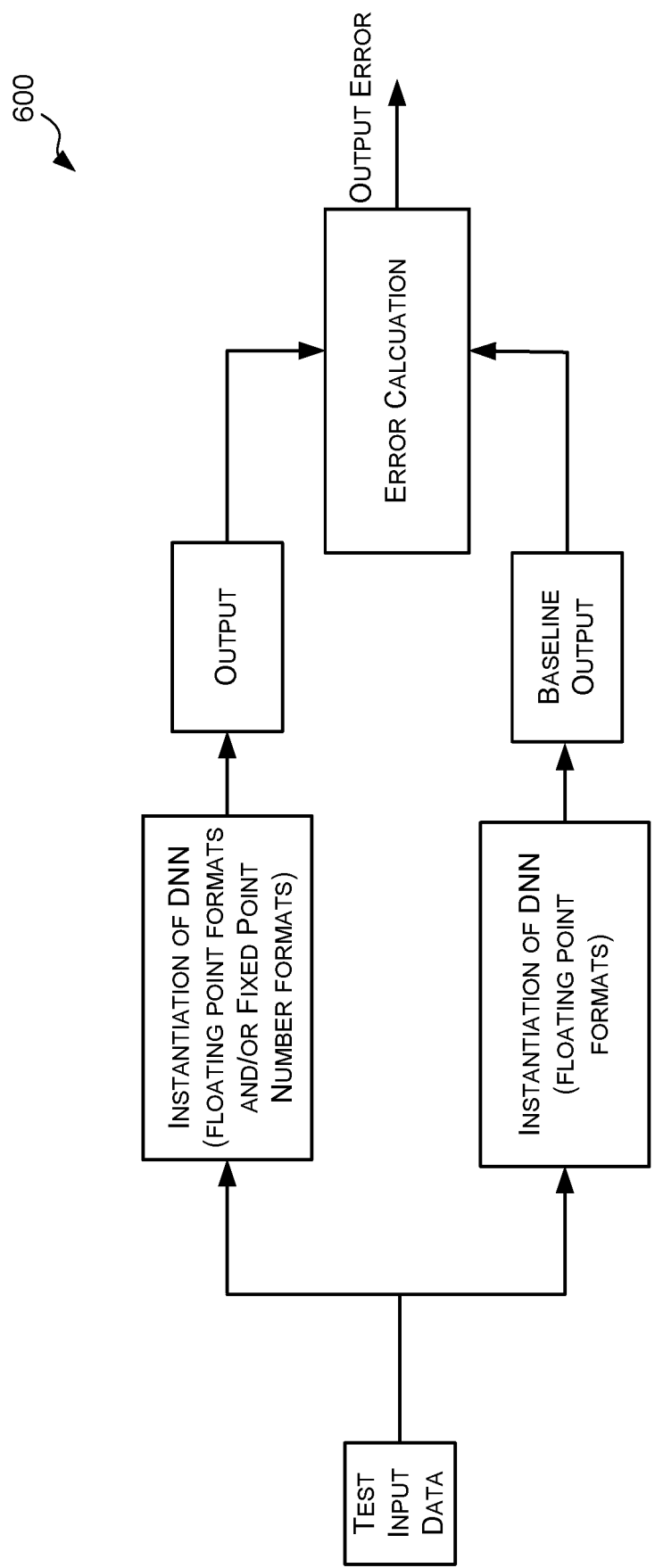
FIG. 6 is a schematic diagram illustrating a first example calculation of the output error associated with a fixed point number format.

In some cases, as shown at 600 in FIG. 6, the error in the output of the temporarily reconfigured instantiation of the DNN may be calculated as the error in the output with respect to a baseline output. The baseline output may be the output of an instantiation of the DNN that is configured to represent the values input to, and output from, each layer in a floating point number format. Such an instantiation may be referred to herein as the floating point instantiation of the DNN. As described above, since values can typically be represented more accurately, or more precisely, in a floating point number format an instantiation of a DNN that is configured to use floating point number formats to represent values input to, and output, from each layer represents an instantiation of the DNN that will produce the best or most accurate output. Accordingly, the output data generated by the floating point instantiation of the DNN may be used as the benchmark or baseline output from which to gauge the accuracy of output data generated by the temporarily reconfigured instantiation of the DNN.

The error between the baseline output of the DNN and the output of the temporarily reconfigured DNN may be determined in any suitable manner. For example, where the output is the set of logits the error between the baseline output and the output of the temporarily reconfigured instantiation of the DNN may be calculated as the L1 distance between corresponding logits. This is illustrated in equation (2) where z is the set of logits in the baseline output and z' is the set of logits in the output of the temporarily reconfigured instantiation of the DNN:

$$\Sigma_i |z_i - z'_i| \quad (2)$$

In other examples, the error between the baseline output and the output of the temporarily reconfigured instantiation of the DNN may be calculated as the L1 distance between the outputs of the SoftMax function with an optional additional temperature parameter T as shown in equation (3). Increasing the temperature makes the SoftMax values "softer" (i.e. less saturation to 0 and 1) and thereby easier to train against.

$$s_i(z; T) = \frac{e^{z_i/T}}{\Sigma_j e^{z_j/T}} \quad (3)$$

Figure 7:
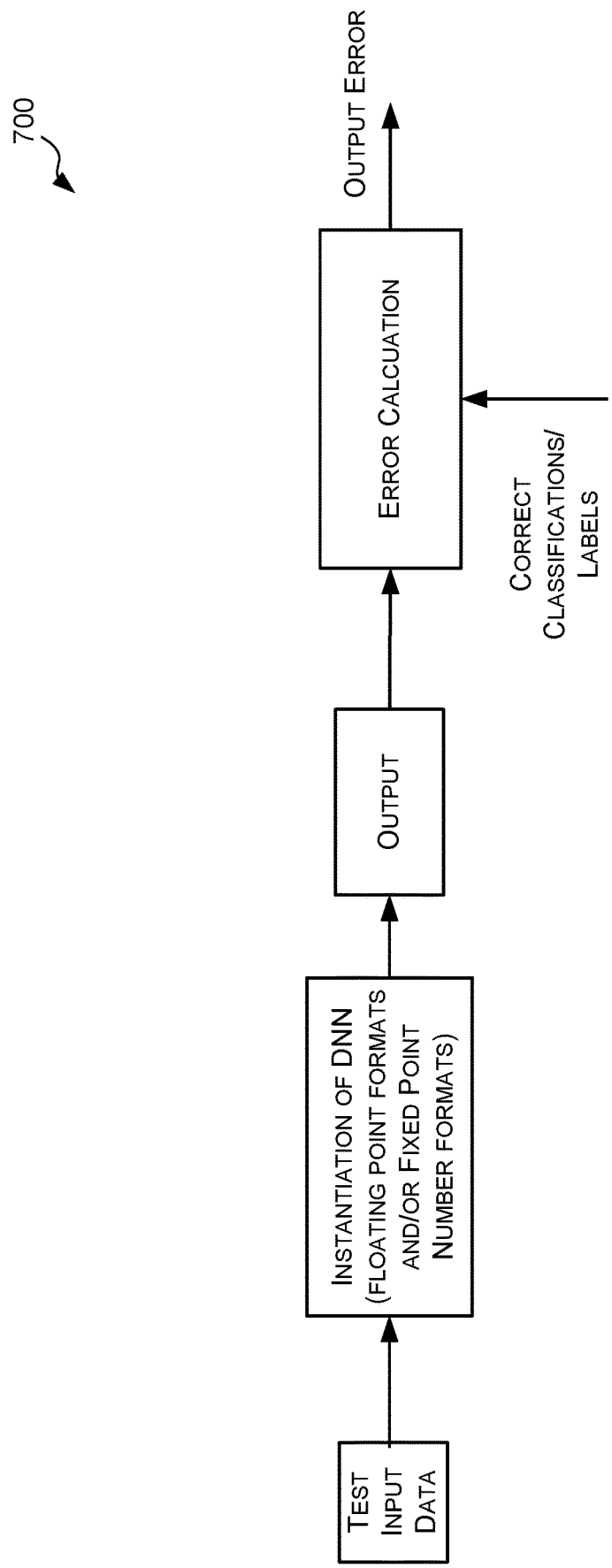
FIG. 7 is a schematic diagram illustrating a second example calculation of the output error associated with a fixed point number format.

In other cases, as shown at 700 in FIG. 7, the error in the output may be a measure of the accuracy of the output. In other words, the error may indicate how accurate the output of the temporarily reconfigured instantiation of the DNN is relative to known results for the test input data. For example, the output error may be calculated as a Top-1 classification accuracy, or a Top-5 classification accuracy based on known correct classifications or labels for the test input data. As is known to those of skill in the art, the Top-1 classification accuracy is a measure of how often the top classification output by the DNN is the correct classification, and the Top-5 classification accuracy is a measure of how often the correct classification is in the top five classifications output by the DNN.

The preceding paragraphs provide examples of how the error in the output of the temporarily reconfigured instantiation of the DNN may be calculated when the DNN is a classification network, but it will be evident a person of skill in the art that the methods and principles described herein may be applied to other types of DNNs. The error in the output of the temporarily reconfigured instantiation of the DNN for other types of DNNs may be calculated using any known manner.

Once the error in the output of the temporarily reconfigured DNN is determined the method 500 proceeds to block 510.

At block 510, a determination is made as to whether there are any more potential fixed point number formats for which an output error has not been determined. If there is at least one potential fixed point number format of the plurality of fixed point number formats for which an output error has not been determined then the method 500 proceeds to block 512 where one of the potential fixed point number formats for which an output error has not been determined is identified as the current fixed point number format. The method 500 then returns to block 504 where the output error associated with the current fixed point number format is determined. If, however, there are no potential fixed point number formats of the plurality of potential fixed point number formats for which an output error has not been determined, then an output error has been determined for all potential fixed point number formats and the method 500 proceeds to block 514.

At block 514, one of the plurality of fixed point number formats is selected as the fixed point number format for representing the set of values for the layer based on the output errors associated with the potential fixed point number formats. In some cases, the potential fixed point number format associated with the best output error may be selected as the fixed point number format for representing the set of values for the layer. What constitutes the "best" output error may depend on how the output error is calculated. For example, where the output error is calculated as the difference between the output of the temporarily reconfigured instantiation of the DNN and a baseline output then the "best" output error may be the lowest or smallest output error (i.e. the smallest difference relative to the baseline output). In contrast, where the output error is a measure of the accuracy of the DNN the "best" output error may be the highest or largest output error (i.e. the best accuracy). Once one of the plurality of fixed point number formats has been selected as the fixed point number format for representing the set of values for the layer then the method 500 ends.

Figure 8:
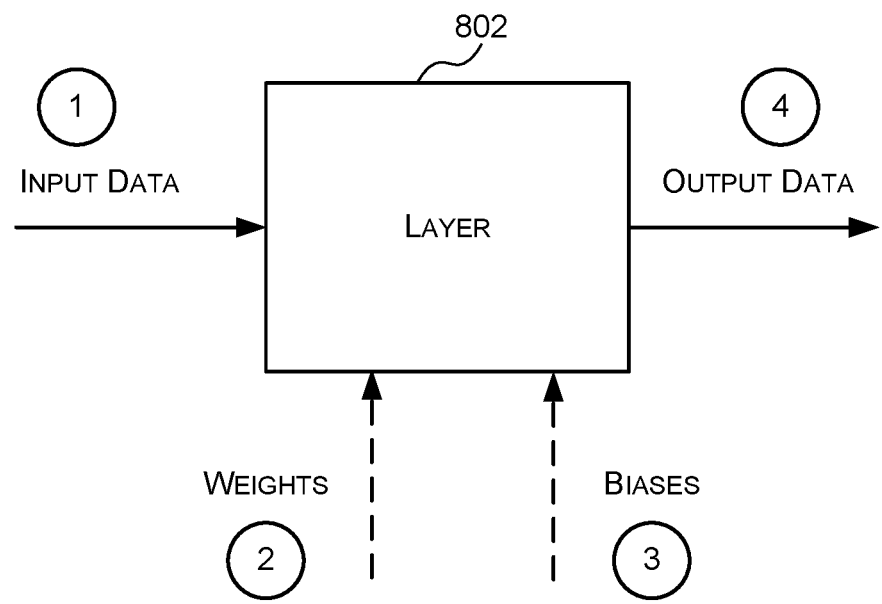
FIG. 8 is a schematic diagram illustrating the values input to and output from a layer.

As described above, each layer may have multiple sets of values which can each be represented in a fixed point number format. The method 500 of FIG. 5 may be executed separately for each different set of values which can be represented in a fixed point number format. For example, as shown in FIG. 8 each layer 802 receives input data values and generates output data values; and some layers (such as convolution layers and fully-connected layers) may also receive weights and/or biases. Each of the input data values, output data values, weights and biases may be described as being a different type of data for the layer. Each of the input data values, output data values, weights and biases may be a set of values for which a fixed point number format is selected. For example, a fixed point number format may be selected to represent the input data values of a layer, a fixed point number format may be selected to represent the output data values of a layer, a fixed point number format may be selected to represent the weights of a layer (if a convolution layer or fully-connected layer) of a layer, and a fixed point number format may be selected to represent the biases of a layer (if a convolution layer or fully-connected layer). In some cases, one or more of the input data values, output data values, weights and biases may be divided into a plurality of subsets or portions and a fixed point number format is selected for each subset or portion. For example, the weights are divided into filters and a separate fixed point number format may be selected for representing each filter or for a group of filters.

Where a fixed point number format is to be selected for each of a plurality different types of values for a layer, the order in which the fixed point number formats are selected may impact how accurately the effect of a fixed point number format for a particular set of values on the output error can be determined. Specifically, the input data values, weights and biases are inputs to a layer thus the fixed point number formats used for these data types affect the output data values. Therefore a more accurate estimate of the affect that the fixed point number format for the output data values has on the output error of the DNN may be determined if the fixed point number formats for the input data values, weights and biases are selected prior to selecting the fixed point number format for the output data values. This allows the fixed point number formats selected for the inputs to be taken into account when selecting the fixed point number format for the output data values. Testing has also shown that the output error may be reduced if the fixed point number format for the input data values is selected prior to selecting the fixed point number formats for the weights and the biases.

Figure 9:
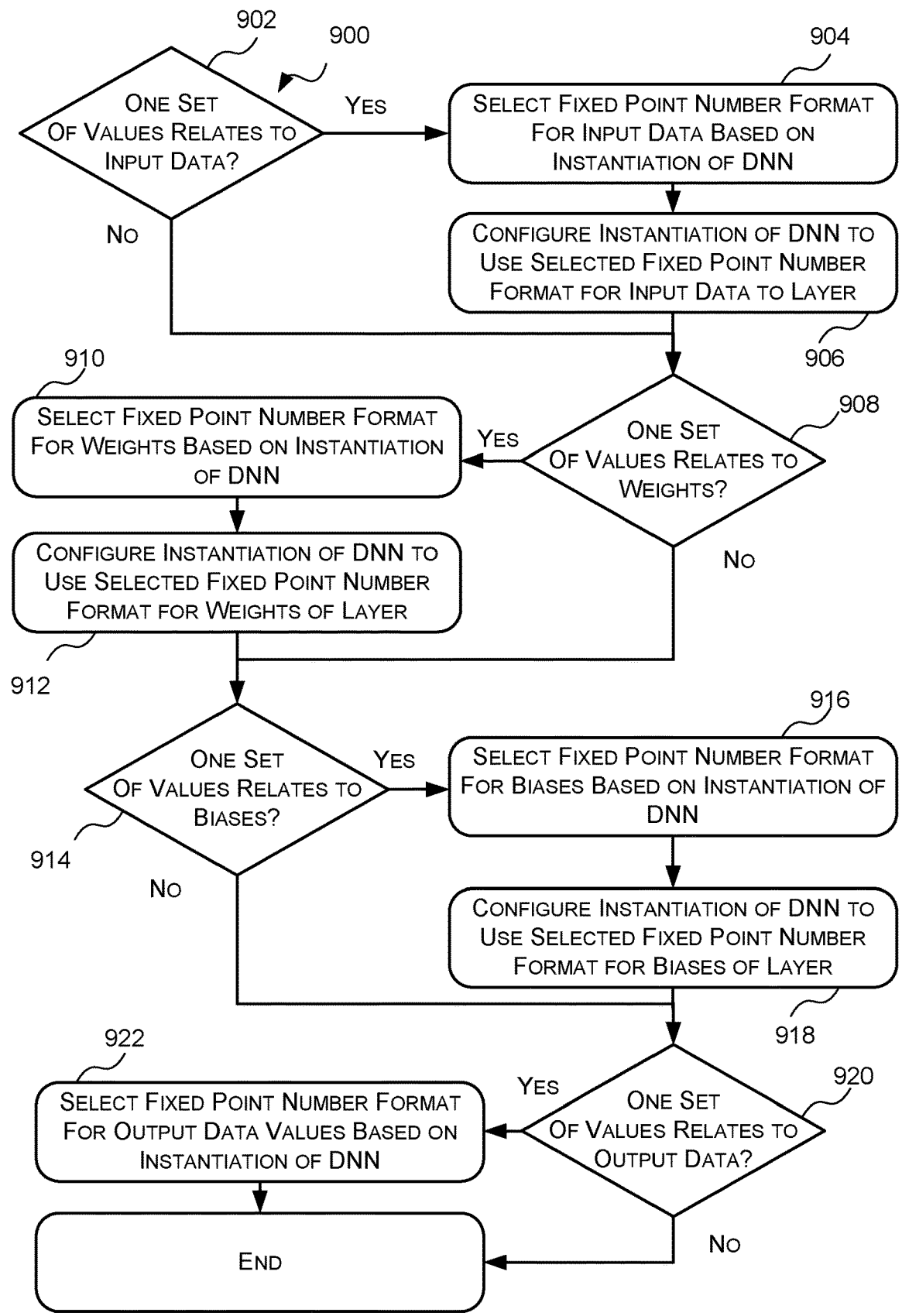
FIG. 9 is a flow diagram of an example method for selecting fixed point number formats for a plurality of sets of values input to, or output from, a layer.

Reference is now made to FIG. 9 which illustrates a method 900 for implementing block 308 of method 300 of FIG. 3 wherein fixed point number formats may be selected for multiple sets of data of a layer that relate to different data types. The method 900 begins at block 902 where a determination is made as to whether the one or more sets of values of a layer for which fixed point number formats are to be selected include a set of values related to the input data values for the layer. If the one or more sets of values includes a set of values related to input data values for the layer then the fixed point number format for that set of values is to be selected first, and the method 900 proceeds to block 904. If the one or more sets of values does not include a set of values related to input data values then the method 900 proceeds to block 908. At block 904 a fixed point number format is selected for the set of values related to the input data values based on the current instantiation of the DNN. The fixed point number format may be selected for the set of values related to the input data values in accordance with the method 500 of FIG. 5 for example. The method 900 then proceeds to block 906 where the instantiation of the DNN is reconfigured so that the selected fixed point number format is used to represent the input data values. The method 900 then proceeds to block 908.

At block 908, a determination is made as to whether the one or more sets of values of a layer for which fixed point number formats are to be selected include a set of values related to the weights for the layer. If the one or more sets of values includes a set of values related to the weights for the layer then the fixed point number format for that set of values is to be selected next and the method 900 proceeds to block 910. If the one or more sets of values does not include a set of values related to the weights of the layer then the method 900 proceeds to block 914. At block 910 a fixed point number format is selected for the set of values related to the weights based on the current instantiation of the DNN (which if there was a fixed point number format selected for the input data values is configured to use that fixed point number format to represent the input data values of the layer). The fixed point number format may be selected for the set of values related to the weights in accordance with the method 500 of FIG. 5 for example. The method 900 then proceeds to block 912 where the instantiation of the DNN is reconfigured so that the selected fixed point number format is used to represent the weights. The method 900 then proceeds to block 914.

At block 914, a determination is made as to whether the one or more sets of values of a layer for which fixed point number formats are to be selected include a set of values related to the biases for the layer. If the one or more sets of values includes a set of values related to the biases for the layer then the fixed point number format for that set of values is to be selected next and the method 900 proceeds to block 916. If the one or more sets of values does not include a set of values related to the biases of the layer then the method 900 proceeds to block 920. At block 916 a fixed point number format is selected for the set of values related to the biases based on the current instantiation of the DNN (which if there was a fixed point number format selected for the input data values is configured to use that fixed point number format to represent the input data values of the layer, and if there was a fixed point number format selected for the weights is configured to use that fixed point number format to represent the weights). The fixed point number format may be selected for the set of values related to the biases in accordance with the method 500 of FIG. 5 for example. The method 900 then proceeds to block 918 where the instantiation of the DNN is reconfigured so that the selected fixed point number format is used to represent the biases. The method 900 then proceeds to block 920.

At block 920, a determination is made as to whether the one or more sets of values of a layer for which fixed point number formats are to be selected includes a set of values related to the output data values for the layer. If the one or more sets of values includes a set of values related to the output data values for the layer then the fixed point number format for that set of values is to be selected next and the method 900 proceeds to block 922. If, however, the one or more sets of values does not include a set of values related to the output data values of the layer then the method 900 ends. At block 922 a fixed point number format is selected for the set of values related to the output data values based on the current instantiation of the DNN (which if there was a fixed point number format selected for the input data values is configured to use that fixed point number format to represent the input data values of the layer, if there was a fixed point number format selected for the weights is configured to use that fixed point number format to represent the weights, and if there was a fixed point number format selected for the biases is configured to use that fixed point number format to represent the biases). The method 900 then ends.

Example Hardware Implementation of a DNN

Figure 10:
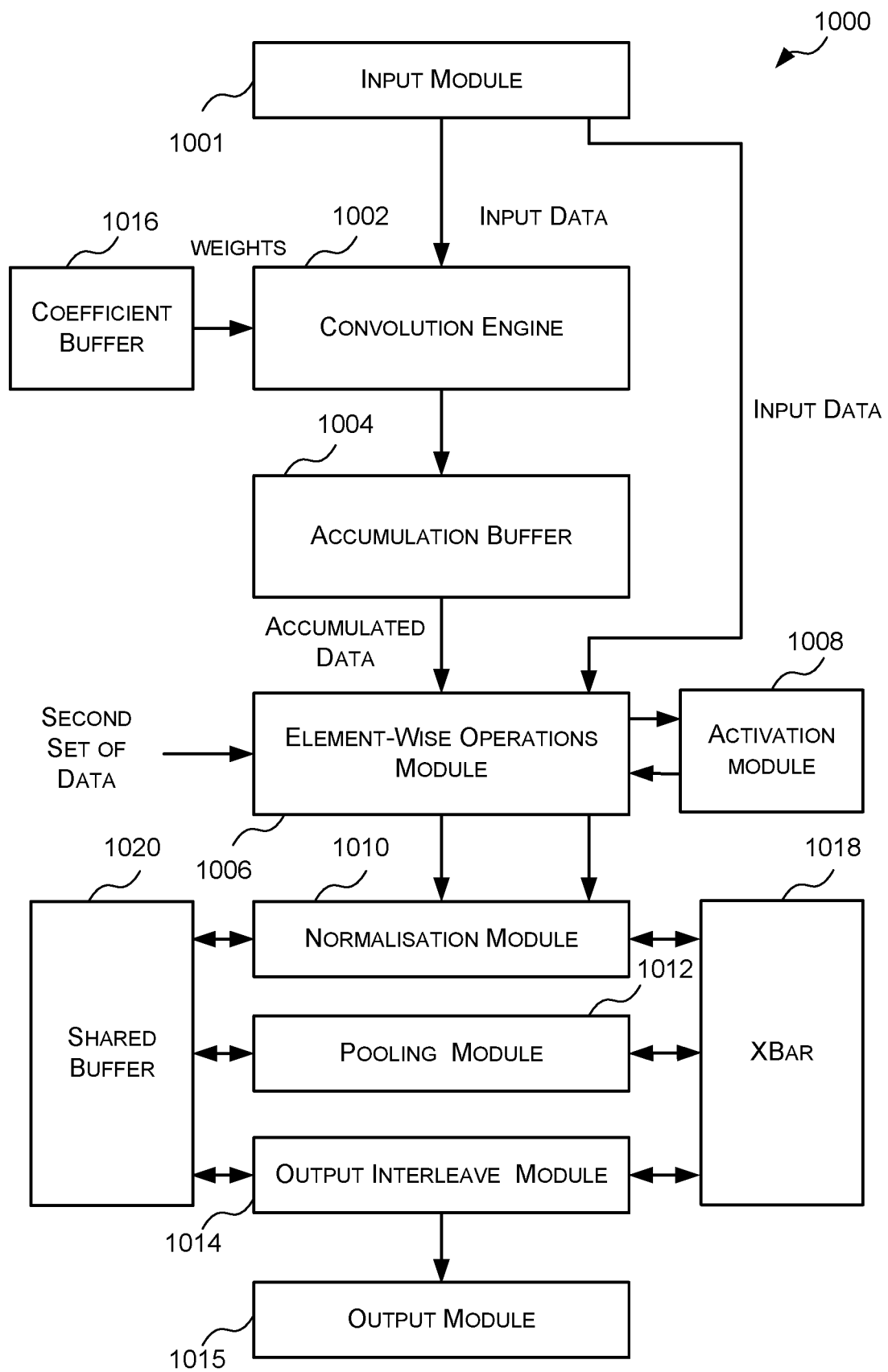
FIG. 10 is a block diagram of an example hardware implementation of a DNN.

Reference is now made to FIG. 10 which illustrates an example hardware implementation of a DNN 1000 which may be configured based on the formats identified using the method 300 of FIG. 3.

The hardware implementation 1000 of FIG. 10 is configured to compute the output of a DNN through a series of hardware passes (which also may be referred to as processing passes) wherein during each pass the hardware implementation receives at least a portion of the input data for a layer of the DNN and processes the received input data in accordance with that layer (and optionally in accordance with one or more subsequent layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example hardware implementation 1000 of FIG. 10 comprises an input module 1001, a convolution engine 1002, an accumulation buffer 1004, an element-wise operations module 1006, an activation module 1008, a normalisation module 1010, a pooling module 1012, an output interleave module 1014 and an output module 1015. Each module or engine implements or processes all or a portion of one or more types of layers. Specifically, together the convolution engine 1002 and the accumulation buffer 1004 implement or process a convolution layer or a fully connected layer. The activation module 1008 processes or implements an activation layer. The normalisation module 1010 processes or implements a normalisation layer. The pooling module 1012 implements a pooling layer and the output interleave module 1014 processes or implements an interleave layer.

The input module 1001 is configured to receive the input data for the current hardware pass and provide it to a downstream module for processing. The downstream module that receives the input data depends on the layers that are to be processed in the current hardware pass.

The convolution engine 1002 is configured to perform a convolution operation on the received input data using the weights associated with a particular convolution layer. The weights for each convolution layer of the DNN may be stored in a coefficient buffer 1016 as shown in FIG. 10 and the weights for a particular convolution layer may be provided to the convolution engine 1002 when that particular convolution layer is being processed by the convolution engine 1002. Where the hardware implementation supports variable weight formats then the convolution engine 1002 may be configured to receive information indicating the format or formats of the weights of the current convolution layer being processed to allow the convolution engine to properly interpret and process the received weights. The weight formats for each convolution layer may be determined by the methods 300, 500 and 900 described herein.

The convolution engine 1002 may comprise a plurality of multipliers (e.g. 128) and a plurality of adders which add the result of the multipliers to produce a single sum. Although a single convolution engine 1002 is shown in FIG. 10, in other examples there may be multiple (e.g. 8) convolution engines so that multiple windows can be processed simultaneously. The output of the convolution engine 1002 is fed to the accumulation buffer 1004.

The accumulation buffer 1004 is configured to receive the output of the convolution engine and add it to the current contents of the accumulation buffer 1004. In this manner, the accumulation buffer 1004 accumulates the results of the convolution engine 1002. Although a single accumulation buffer 1004 is shown in FIG. 10, in other examples there may be multiple (e.g. 8, one per convolution engine) accumulation buffers. The accumulation buffer 1004 outputs the accumulated result to the element-wise operations module 1006 which may or may not operate on the accumulated result depending on whether an element-wise layer is to be processed during the current hardware pass.

The element-wise operations module 1006 is configured to receive either the input data for the current hardware pass (e.g. when a convolution layer is not processed in the current hardware pass) or the accumulated result from the accumulation buffer 1004 (e.g. when a convolution layer is processed in the current hardware pass). The element-wise operations module 1006 may either process the received input data or pass the received input data to another module (e.g. the activation module 1008 and/or or the normalisation module 1010) depending on whether an element-wise layer is processed in the current hardware pass and/or depending on whether an activation layer is to be processed prior to an element-wise layer. When the element-wise operations module 1006 is configured to process the received input data the element-wise operations module 1006 performs an element-wise operation on the received data (optionally with another data set (which may be obtained from external memory)). The element-wise operations module 1006 may be configured to perform any suitable element-wise operation such as, but not limited to add, multiply, maximum, and minimum. The result of the element-wise operation is then provided to either the activation module 1008 or the normalisation module 1010 depending on whether an activation layer is to be processed subsequent the element-wise layer or not.

The activation module 1008 is configured to receive one of the following as input data: the original input to the hardware pass (via the element-wise operations module 1006) (e.g. when a convolution layer is not processed in the current hardware pass); the accumulated data (via the element-wise operations module 1006) (e.g. when a convolution layer is processed in the current hardware pass and either an element-wise layer is not processed in the current hardware pass or an element-wise layer is processed in the current hardware pass but follows an activation layer). The activation module 1008 is configured to apply an activation function to the input data and provide the output data back to the element-wise operations module 1006 where it is forwarded to the normalisation module 1010 directly or after the element-wise operations module 1006 processes it. In some cases, the activation function that is applied to the data received by the activation module 1008 may vary per activation layer. In these cases, information specifying one or more properties of an activation function to be applied for each activation layer may be stored (e.g. in memory) and the relevant information for the activation layer processed in a particular hardware pass may be provided to the activation module 1008 during that hardware pass.

In some cases, the activation module 1008 may be configured to store, in entries of a lookup table, data representing the activation function. In these cases, the input data may be used to lookup one or more entries in the lookup table and output values representing the output of the activation function. For example, the activation module 1008 may be configured to calculate the output value by interpolating between two or more entries read from the lookup table.

In some examples, the activation module 1008 may be configured to operate as a Rectified Linear Unit (ReLU) by implementing a ReLU function. In a ReLU function, the output element $y_{i,j,k}$ is calculated by identifying a maximum value as set out in equation (4) wherein for x values less than 0, y=0:

$$y_{i,j,k}=f(x_{i,j,k})=\max\{0, x_{i,j,k}\} \quad (4)$$

In other examples, the activation module 1008 may be configured to operate as a Parametric Rectified Linear Unit (PReLU) by implementing a PReLU function. The PReLU function performs a similar operation to the ReLU function. Specifically, where $w_1, w_2, b_1, b_2 \in R$ are constants, the PReLU is configured to generate an output element $y_{i,j,k}$ as set out in equation (5):

$$y_{i,j,k}=f(x_{i,j,k};w_1,w_2,b_1,b_2)=\max\{(w_1*x_{i,j,k}+b_1), (w_2*x_{i,j,k}+b_2)\} \quad (5)$$

The normalisation module 1010 is configured to receive one of the following as input data: the original input data for the hardware pass (via the element-wise operations module 1006) (e.g. when a convolution layer is not processed in the current hardware pass and neither an element-wise layer nor an activation layer is processed in the current hardware pass); the accumulation output (via the element-wise operations module 1006) (e.g. when a convolution layer is processed in the current hardware pass and neither an element-wise layer nor an activation layer is processed in the current hardware pass); and the output data of the element-wise operations module and/or the activation module. The normalisation module 1010 then performs a normalisation function on the received input data to produce normalised data. In some cases, the normalisation module 1010 may be configured to perform a Local Response Normalisation (LRN) Function and/or a Local Contrast Normalisation (LCN) Function. However, it will be evident to a person of skill in the art that these are examples only and that the normalisation module 1010 may be configured to implement any suitable normalisation function or functions. Different normalisation layers may be configured to apply different normalisation functions.

The pooling module 1012 may receive the normalised data from the normalisation module 1010 or may receive the input data to the normalisation module 1010 via the normalisation module 1010. In some cases, data may be transferred between the normalisation module 1010 and the pooling module 1012 via an XBar 1018. The term "XBar" is used herein to refer to a simple hardware module that contains routing logic which connects multiple modules together in a dynamic fashion. In this example, the XBar may dynamically connect the normalisation module 1010, the pooling module 1012 and/or the output interleave module 1014 depending on which layers will be processed in the current hardware pass. Accordingly, the XBar may receive information each hardware pass indicating which modules 1010, 1012, 1014 are to be connected.

The pooling module 1012 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 1014 may receive the normalised data from the normalisation module 1010, the input data to the normalisation function (via the normalisation module 1010), or the pooled data from the pooling module 1012. In some cases, the data may be transferred between the normalisation module 1010, the pooling module 1012 and the output interleave module 1014 via an XBar 1018. The output interleave module 1014 is configured to perform a rearrangement operation to produce data that is in a predetermined order. This may comprise sorting and/or transposing the received data. The data generated by the last of the layers is provided to the output module 1015 where it is converted to the desired output format for the current hardware pass. The desired output format may be determined according to the methods 300, 500 and 900 described herein (e.g. as the fixed point number format for representing the output data values of the last layer of the hardware pass or the fixed point number format for representing the input data values of the first layer of the next hardware pass).

The normalisation module 1010, the pooling module 1012, and the output interleave module 1014 may each have access to a shared buffer 1020 which can be used by these modules 1010, 1012 and 1014 to write data to and retrieve data from. For example, the shared buffer 1020 may be used by these modules 1010, 1012, 1014 to rearrange the order of the received data or the generated data. For example, one or more of these modules 1010, 1012, 1014 may be configured to write data to the shared buffer 1020 and read the same data out in a different order. In some cases, although each of the normalisation module 1010, the pooling module 1012 and the output interleave module 1014 have access to the shared buffer 1020, each of the normalisation module 1010, the pooling module 1012 and the output interleave module 1014 may be allotted a portion of the shared buffer 1020 which only they can access. In these cases, each of the normalisation module 1010, the pooling module 1012 and the output interleave module 1014 may only be able to read data out of the shared buffer 1020 that they have written in to the shared buffer 1020.

As described above the modules of the hardware implementation 1000 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first convolution layer needs to be written out to memory before it can be used as an input to the second convolution layer. In each of these hardware passes only the modules, components or engines relevant to a convolution layer, such as the convolution engine 1002 and the accumulation buffer 1004, may be used or active.

Although the hardware implementation 1000 of FIG. 10 illustrates a particular order in which the modules, engines etc. are arranged and thus how the processing of data flows through the hardware implementation, it will be appreciated that this is an example only and that in other examples the modules, engines etc. may be arranged in a different manner. Furthermore, other hardware implementations may implement additional or alternative types of DNN layers and thus may comprise different modules, engines etc.

Figure 11:
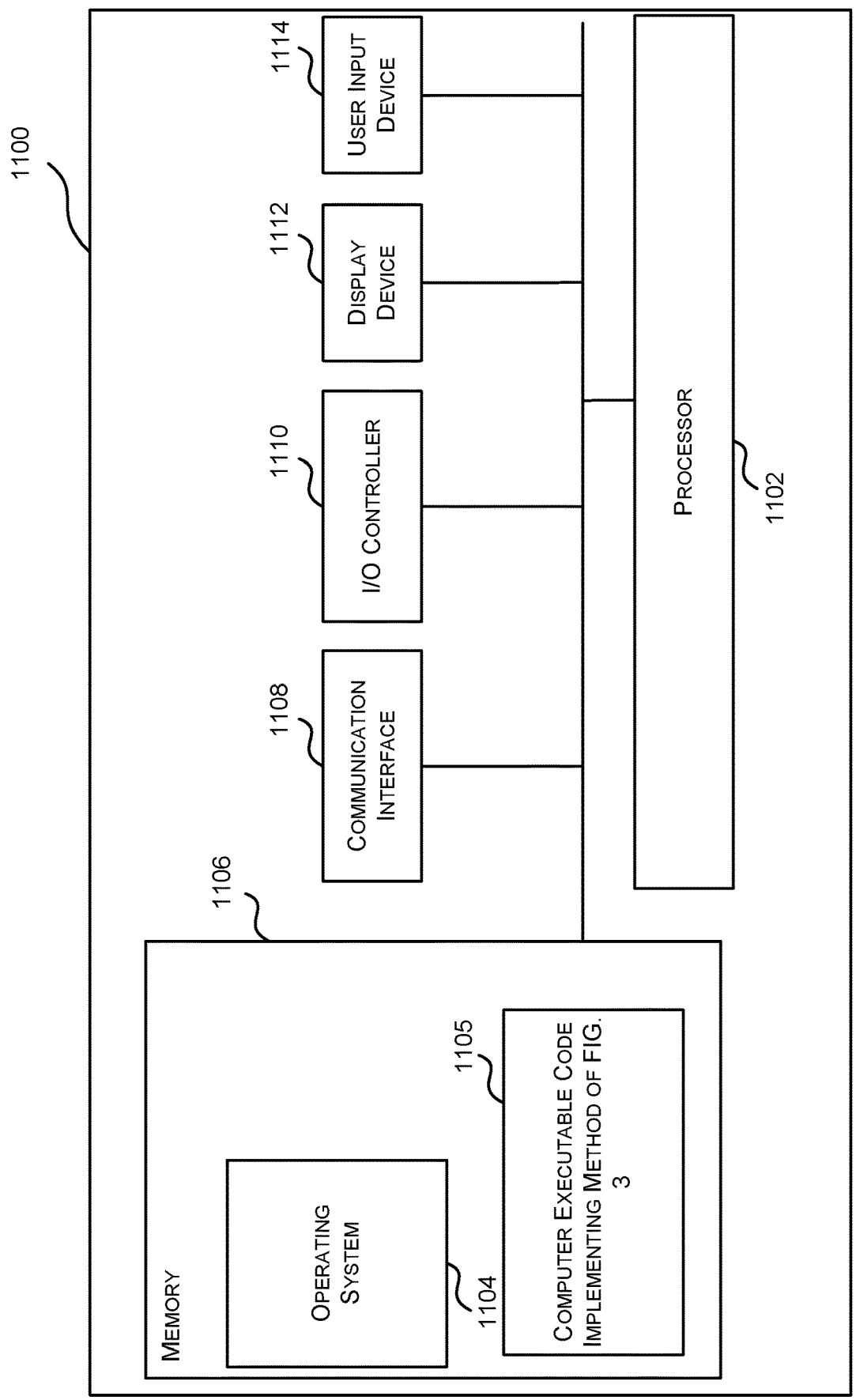
FIG. 11 is a block diagram of an example computing-based device.

FIG. 11 illustrates various components of an exemplary general purpose computing-based device 1100 which may be implemented as any form of a computing and/or electronic device, and in which embodiments of the methods 300, 500, 900 described above may be implemented.

Computing-based device 1100 comprises one or more processors 1102 which may be microprocessors, controllers or any other suitable type of processors for processing computer executable instructions to control the operation of the device in order to select fixed point number formats for sets of values input to, and output from, layers of a DNN. In some examples, for example where a system on a chip architecture is used, the processors 1102 may include one or more fixed function blocks (also referred to as accelerators) which implement a part of the method of selecting fixed point number formats for sets of values input to, and output from, layers of a DNN in hardware (rather than software or firmware). Platform software comprising an operating system 1104 or any other suitable platform software may be provided at the computing-based device to enable application software, such as computer executable code 1105 for implementing the method 300 of FIG. 3, to be executed on the device.

The computer executable instructions may be provided using any computer-readable media that is accessible by computing based device 1100. Computer-readable media may include, for example, computer storage media such as memory 1106 and communications media. Computer storage media (i.e. non-transitory machine readable media), such as memory 1106, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1106) is shown within the computing-based device 1100 it will be appreciated that the storage may be distributed or located remotely and accessed via a network or other communication link (e.g. using communication interface 1108).

The computing-based device 1100 also comprises an input/output controller 1110 arranged to output display information to a display device 1112 which may be separate from or integral to the computing-based device 1100. The display information may provide a graphical user interface. The input/output controller 1110 is also arranged to receive and process input from one or more devices, such as a user input device 1114 (e.g. a mouse or a keyboard). In an embodiment the display device 1112 may also act as the user input device 1114 if it is a touch sensitive display device. The input/output controller 1110 may also output data to devices other than the display device, e.g. a locally connected printing device (not shown in FIG. 11).

Figure 12:
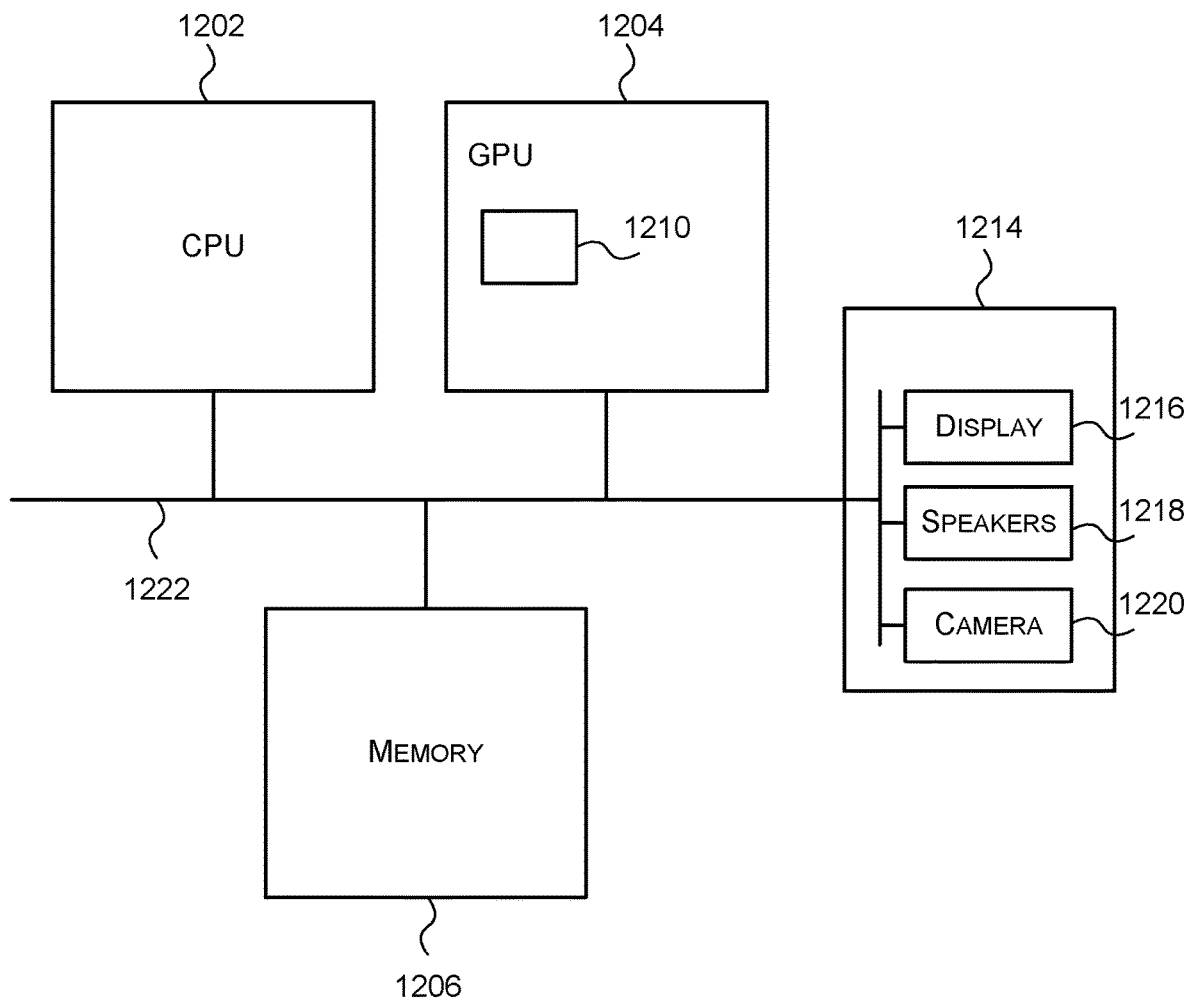
FIG. 12 is a block diagram of an example computer system in which the hardware implementation of the DNN is implemented.

FIG. 12 shows a computer system in which the hardware implementations for a DNN described herein may be implemented. The computer system comprises a CPU 1202, a GPU 1204, a memory 1206 and other devices 1214, such as a display 1216, speakers 1218 and a camera 1220. A hardware implementation of a DNN 1210 (corresponding to the hardware implementation of a DNN 1000) may be implemented on the GPU 1204, as shown in FIG. 12. In some examples, there may not be a GPU and the CPU may provide control information to the hardware implementation of a DNN 1210. The components of the computer system can communicate with each other via a communications bus 1222. In other examples, the hardware implementation of a DNN 1210 may be implemented independent from the CPU or the GPU and may have a separate connection to the communications bus 1222.

The hardware implementation of a DNN 1000 of FIG. 10 is shown as comprising a number of functional blocks. This is schematic only and is not intended to define a strict division between different logic elements of such entities. Each functional block may be provided in any suitable manner. It is to be understood that intermediate values described herein as being formed by a hardware implementation of a DNN need not be physically generated by the hardware implementation of a DNN or the processing module at any point and may merely represent logical values which conveniently describe the processing performed by the hardware implementation of a DNN between its input and output.

The hardware implementations of a DNN described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of a DNN described herein. An integrated circuit definition dataset may be, for example, an integrated circuit description.

Therefore, there may be provided a method of manufacturing, at an integrated circuit manufacturing system, a hardware implementation of a DNN as described herein. Furthermore, there may be provided an integrated circuit definition dataset that, when processed in an integrated circuit manufacturing system, causes the method of manufacturing a hardware implementation of a DNN to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a DNN will now be described with respect to FIG. 13.

Figure 13:
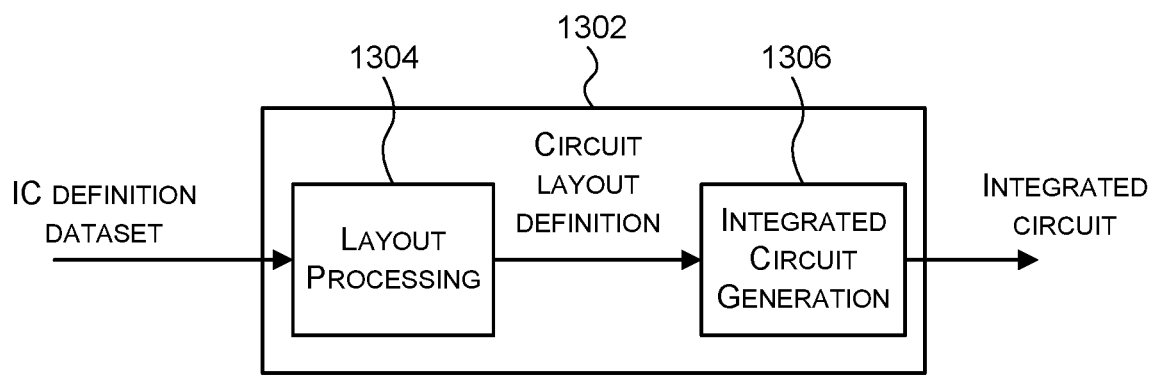
FIG. 13 is a block diagram of an example integrated circuit manufacturing system for generating an integrated circuit embodying a hardware implementation of a DNN as described herein.

FIG. 13 shows an example of an integrated circuit (IC) manufacturing system 1302 which is configured to manufacture a hardware implementation of a DNN as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a hardware implementation of a DNN as described in any of the examples herein), process the IC definition dataset, and generate an IC according to the IC definition dataset (e.g. which embodies a hardware implementation of a DNN as described in any of the examples herein). The processing of the IC definition dataset configures the IC manufacturing system 1302 to manufacture an integrated circuit embodying a hardware implementation of a DNN as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a DNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of identifying fixed point number formats for representing values input to, and/or output from, a plurality of layers of a Deep Neural Network (DNN) for use in configuring a hardware implementation of the DNN, the method comprising:
   determining a sequence of the plurality of layers in which each of the plurality of layers is preceded by any layer in the plurality of layers on which it depends;
   receiving an instantiation of the DNN configured to represent values input to, and/or, output from the plurality of layers of the DNN using a floating point number format;
   identifying a first layer in the determined sequence as a current layer, and for the current layer:
   (a) selecting a fixed point number format for representing each of one or more sets of values input to, or output from, the current layer, wherein the fixed point number format for representing a set of values input to, or output from, the current layer is selected so as to minimize an output error of the instantiation of the DNN; and
   (b) reconfiguring the instantiation of the DNN to represent each of the one or more sets of values input to, or output from, the current layer using the selected fixed point number format for that set of values;
   subsequent to the reconfiguring, determining whether there is at least one more layer in the determined sequence following the current layer; and
   in response to determining that there is at least one more layer in the determined sequence following the current layer, identifying a next layer in the determined sequence as the current layer and repeating (a) and (b).

2. The method of claim 1, wherein selecting a fixed point number format for representing a set of values input to, or output from, a layer comprises:
   for each fixed point number format of a plurality of potential fixed point number formats:
      temporarily configuring the instantiation of the DNN to represent the set of values for the layer using the fixed point number format;
      determining an output of the temporarily configured instantiation of the DNN in response to test input data; and
      determining an output error of the temporarily configured instantiation of the DNN; and
   selecting a fixed point number format to represent the set of values input to, or output from, the layer based on the output errors associated with each of the plurality of potential fixed point number formats.

3. The method of claim 2, wherein the fixed point number format associated with the lowest output error is selected as the fixed point number format for representing the set of values.

4. The method of claim 2, wherein each potential fixed point number format comprises an exponent and a mantissa bit length and each of the plurality of potential fixed point number formats comprises a same mantissa bit length and a different exponent.

5. The method of claim 1, wherein selecting a fixed point number format for representing each of one or more sets of values input to, or output from, the layer comprises:
   selecting a fixed point number format for representing at least a portion of input data values for the layer that minimizes an output error in the instantiation of the DNN;
   reconfiguring the instantiation of the DNN to represent the at least a portion of the input data values for the layer in the selected fixed point number format; and
   subsequent to the reconfiguring, selecting a fixed point number format for representing at least a portion of output data values for the layer that minimizes an output error in the instantiation of the DNN.

6. The method of claim 5, wherein selecting a fixed point number format for representing each of one or more sets of values input to, or output from, the layer further comprises:
   selecting a fixed point number format for representing at least a portion of weights for the layer that minimizes an output error in the instantiation of the DNN; and
   reconfiguring the instantiation of the DNN to represent the at least a portion of the weights for the layer in the selected fixed point number format prior to selecting a fixed point number format for representing the at least a portion of output data values for the layer.

7. The method of claim 1, wherein the DNN is a classification network and the output error is a Top-1 classification accuracy of an output of the instantiation of the DNN in response to test input data.

8. The method of claim 1, wherein the DNN is a classification network and the output error is a top-5 classification accuracy of an output of the instantiation of the DNN in response to test input data.

9. The method of claim 1, wherein the DNN is a classification network and the output error is a sum of absolute differences between logits of an output of the instantiation of the DNN in response to test input data and logits of a baseline output.

10. The method of claim 1, wherein the DNN is a classification network and the output error is a sum of absolute differences between SoftMax normalised logits of an output of the instantiation of the DNN and SoftMax normalised logits of a baseline output.

11. The method of claim 10, further comprising generating the baseline output by applying the input test data to an instantiation of the DNN configured to represent values input to and/or output from the plurality of layers using a floating point number format.

12. The method of claim 1, wherein each fixed point number format comprises an exponent and a mantissa bit length.

13. The method of claim 1, further comprising outputting the selected fixed point number formats for the plurality of layers for use in configuring the hardware implementation of the DNN.

14. The method of claim 1, further comprising configuring a hardware implementation of the DNN to represent a set of values input to, or output from, at least one of the plurality of layers using the selected fixed point number format for that set of values.

15. A non-transitory computer readable storage medium having stored thereon computer readable instructions that, when executed at a computer system, cause the computer system to perform the method as set forth in claim 1.

16. A computing-based device for identifying fixed point number formats for representing values input to, and/or output from, a plurality of layers of a Deep Neural Network (DNN) for use in configuring a hardware implementation of the DNN, the computing-based device comprising:
    at least one processor; and
    memory coupled to the at least one processor, the memory comprising:
        an instantiation of the DNN configured to represent values input to, and/or, output from the plurality of layers of the DNN using a floating point number format; and
        computer readable code that when executed by the at least one processor causes the at least one processor to:
            determine a sequence of the plurality of layers in which each of the plurality of layers is preceded by any layer in the plurality of layers on which it depends;
            identify a first layer in the determined sequence as a current layer, and for the current layer:
                (a) select a fixed point number format from a plurality of potential fixed point number formats for representing each of one or more sets of values input to, or output from, the current layer, wherein the fixed point number format for representing a set of values input to, or output from, the layer is selected as the potential fixe point number format of the plurality of fixed point number formats that minimizes an output error of the instantiation of the DNN; and
                (b) reconfigure the instantiation of the DNN to represent each of the one or more sets of values input to, or output from, the current layer using the selected fixed point number format for that set of values;
            subsequent to the reconfiguration, determine whether there is at least one more layer in the determined sequence following the current layer; and
            in response to determining that there is at least one more layer in the determined sequence following the current layer, identify a next layer in the determined sequence as the current layer and repeat (a) and (b).

17. A hardware implementation of a Deep Neural Network (DNN) comprising:
    hardware logic circuitry configured to:
        receive input data values, a set of weights or a set of biases of a layer of the DNN;
        receive information indicating a fixed point number format for the input data values, the set of weights or the set of biases of the layer, the fixed point number format for the input data values, the set of weights or the set of biases of the layer having been selected in accordance with the method of as set forth in claim 1;
        interpret the input data values, the set of weights or the set of biases based on the fixed point number format for the input data values, the set of weights or the set of biases of the layer; and
        process the interpreted input data values, set of weights or set of biases in accordance with the layer to generate output data values for the layer.

18. The hardware implementation of a DNN of claim 17, wherein the hardware logic circuitry is further configured to:
    receive information indicating a fixed point number format for the output data values of the layer, the fixed point number format for the output data values of the layer having been selected in accordance with the method as set forth in claim 1; and
    convert the output data values for the layer into the fixed point number format for the output data values of the layer.

19. The hardware implementation of a DNN of claim 17, wherein the hardware logic circuitry is configured to receive input data values for the layer and information indicating a fixed point number format for the input data values of that layer and the hardware logic circuitry is further configured to:
    receive input data values for another layer of the DNN;
    receive information indicating a fixed point number format for the input data values of the other layer, the fixed point number format for the input data values of the other layer being different than the fixed point number format for the input data values of the layer;
    interpret the input data values for the other layer based on the fixed point number format for the input data values of the other layer; and
    process the interpreted input data values of the other layer in accordance with the other layer to generate output data values for the other layer.

20. A non-transitory computer readable storage medium having stored thereon a computer readable dataset description of the hardware implementation as set forth in claim 17 that, when processed in an integrated circuit manufacturing system, causes the integrated circuit manufacturing system to manufacture an integrated circuit embodying the hardware implementation.

* * * * *